United States Patent
Lee et al.

(10) Patent No.: US 12,270,998 B2
(45) Date of Patent: Apr. 8, 2025

(54) DISPLAY DEVICE AND METHOD OF CONTROLLING THE SAME

(71) Applicant: SAMSUNG DISPLAY CO., LTD., Yongin-si (KR)

(72) Inventors: Cheon Myeong Lee, Seoul (KR); Sang Ho Kim, Gwangmyeong-si (KR); Soo Min Baek, Hwaseong-si (KR); Ji Won Lee, Suwon-si (KR); Ju Hwa Ha, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 272 days.

(21) Appl. No.: 17/499,150

(22) Filed: Oct. 12, 2021

(65) Prior Publication Data

US 2022/0229297 A1    Jul. 21, 2022

(30) Foreign Application Priority Data

Jan. 18, 2021 (KR) .......................... 10-2021-0006772

(51) Int. Cl.
*G02B 27/01* (2006.01)

(52) U.S. Cl.
CPC ..... *G02B 27/0172* (2013.01); *G02B 27/0179* (2013.01); *G02B 2027/0138* (2013.01); *G02B 2027/0187* (2013.01)

(58) Field of Classification Search
CPC ............ G02B 27/0172; G02B 27/0179; G02B 27/0093; G02B 27/014; G02B 2027/0138; G02B 2027/0187; G02B 2027/014; G02B 3/0037; G02B 17/0816; H04N 13/254; H04N 13/344; H04N 13/383; H04N 13/346; H10K 59/00

See application file for complete search history.

(56) References Cited

U.S. PATENT DOCUMENTS

| | | | |
|---|---|---|---|
| 6,449,309 B1 * | 9/2002 | Tabata | H04N 13/344 348/E13.047 |
| 9,380,287 B2 | 6/2016 | Nistico et al. | |

(Continued)

FOREIGN PATENT DOCUMENTS

| | | |
|---|---|---|
| KR | 1020160022927 | 3/2016 |
| KR | 1020190116195 | 10/2019 |
| WO | 2015077718 | 5/2015 |

*Primary Examiner* — Priyank J Shah
(74) *Attorney, Agent, or Firm* — F. Chau & Associates, LLC

(57) ABSTRACT

A display device includes a display unit including a first surface emitting first light, a second surface opposite to the first surface, a first transmission area transmitting light incident on the first surface, and a second transmission area transmitting the light incident on the first surface. The display device includes a first lens on the first surface and including a first hole overlapping the first transmission area in a thickness direction, a second lens on the first surface and spaced apart from the first lens and including a second hole overlapping the second transmission area in the thickness direction, and light sources emitting second light and disposed on the first and second lenses. The display device includes a first camera sensor on the second surface and overlapping the first transmission area, and a second camera sensor on the second surface and overlapping the second transmission area.

21 Claims, 12 Drawing Sheets

(56) References Cited

U.S. PATENT DOCUMENTS

| | | | |
|---|---|---|---|
| 10,607,075 B2 | 3/2020 | Gustafsson et al. | |
| 2012/0056847 A1* | 3/2012 | Milford | G02B 27/017 |
| | | | 345/174 |
| 2012/0162490 A1 | 6/2012 | Chung et al. | |
| 2012/0327197 A1* | 12/2012 | Yamashita | G06T 7/593 |
| | | | 348/E13.074 |
| 2014/0132925 A1* | 5/2014 | Wada | A61B 3/152 |
| | | | 351/208 |
| 2016/0307372 A1* | 10/2016 | Pitts | H04N 23/957 |
| 2018/0079370 A1* | 3/2018 | Davis | B60R 11/04 |
| 2018/0330652 A1* | 11/2018 | Perreault | G06T 3/40 |
| 2019/0079581 A1* | 3/2019 | Tsurumi | G06V 10/147 |
| 2019/0162955 A1* | 5/2019 | Jang | G02B 27/0955 |
| 2019/0235236 A1* | 8/2019 | Ollila | G02B 27/017 |
| 2020/0319460 A1* | 10/2020 | Choi | G02B 27/0176 |

* cited by examiner

LS1: LS11, LS12, LS13, LS14
LS2: LS21, LS22, LS23, LS24

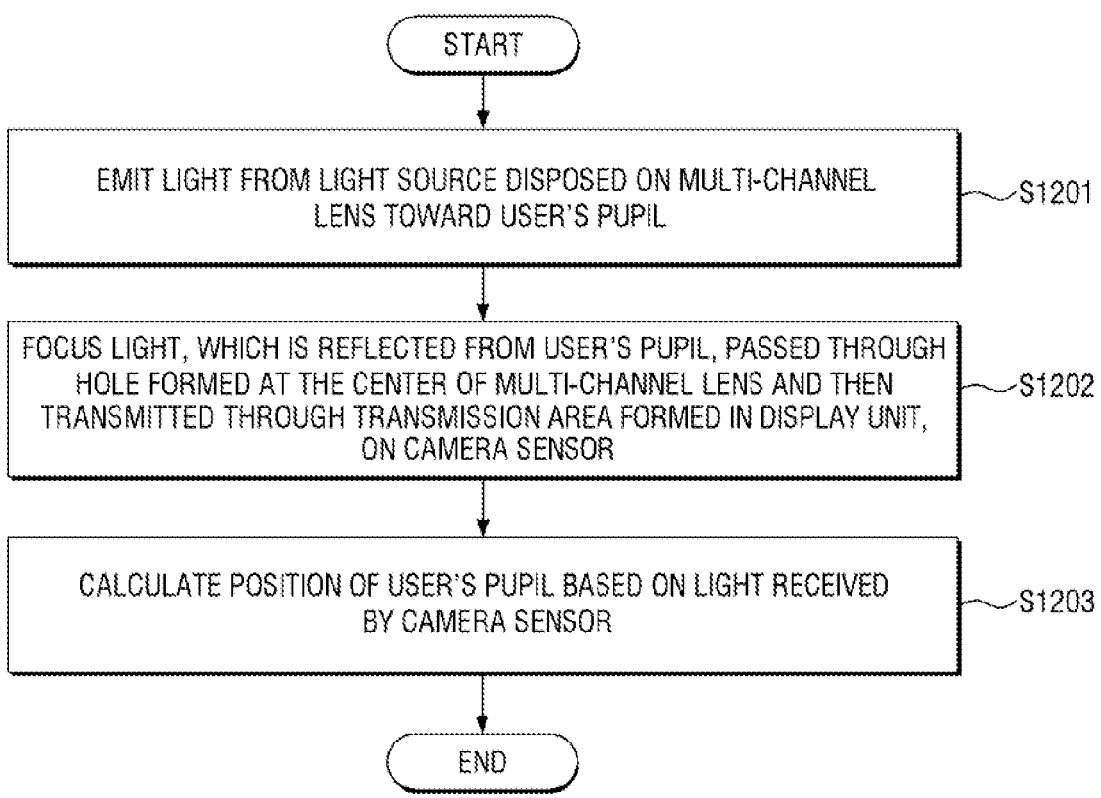

DISPLAY DEVICE AND METHOD OF CONTROLLING THE SAME

CROSS-REFERENCE TO RELATED APPLICATIONS

This application claims priority under 35 U.S.C. § 119 to Korean Patent Application No. 10-2021-0006772, filed on Jan. 18, 2021 in the Korean Intellectual Property Office, the disclosure of which is incorporated by reference herein in its entirety.

TECHNICAL FIELD

Embodiments of the present disclosure relate to a display device and a method of controlling the same.

DISCUSSION OF RELATED ART

Some display devices may have a form configured to be worn on a user's body. These electronic devices are commonly called wearable devices. Since wearable devices are directly worn on the body, portability and user accessibility are factors to be taken into consideration when designing and manufacturing these devices.

An example of a wearable electronic devices is a head-mounted display (head-mounted electronic device) that can be mounted on a user's head. Head-mounted displays may be broadly classified as a see-through type that provides augmented reality (AR) and a see-closed type that provides virtual reality (VR).

SUMMARY

Aspects of the present disclosure provide a display device which can accurately calculate the position of a user's pupils and prevent interference with the user when worn by the user, and a method of controlling the display device.

According to an embodiment, a display device includes a display unit including a first surface that emits first light, a second surface disposed opposite to the first surface, a first transmission area that transmits light incident on the first surface, and a second transmission area that transmits the light incident on the first surface. The second transmission area is spaced apart from the first transmission area. The display device further includes a first lens disposed on the first surface of the display unit and including a first hole overlapping the first transmission area in a thickness direction, a second lens disposed on the first surface of the display unit and spaced apart from the first lens, and including a second hole overlapping the second transmission area in the thickness direction, and a plurality of light sources disposed on the first lens and the second lens. The light sources emit a second light. The display device includes a first camera sensor disposed on the second surface of the display unit and overlapping the first transmission area, and a second camera sensor disposed on the second surface of the display unit and overlapping the second transmission area.

According to an embodiment, a method of controlling a display device includes emitting light from a light source disposed on a multi-channel lens toward a user's pupil, focusing the light, which is reflected from the user's pupil, passed through a hole formed at a center of the multi-channel lens and then transmitted through a transmission area formed in a display unit, on a camera sensor, and calculating a position of the user's pupil based on the light received by the camera sensor.

BRIEF DESCRIPTION OF THE DRAWINGS

The above and other features of the present invention will become more apparent by describing in detail embodiments thereof with reference to the accompanying drawings, in which:

FIG. 12 is a flowchart illustrating a method of controlling a display device according to an embodiment.

DETAILED DESCRIPTION

Figure 1:
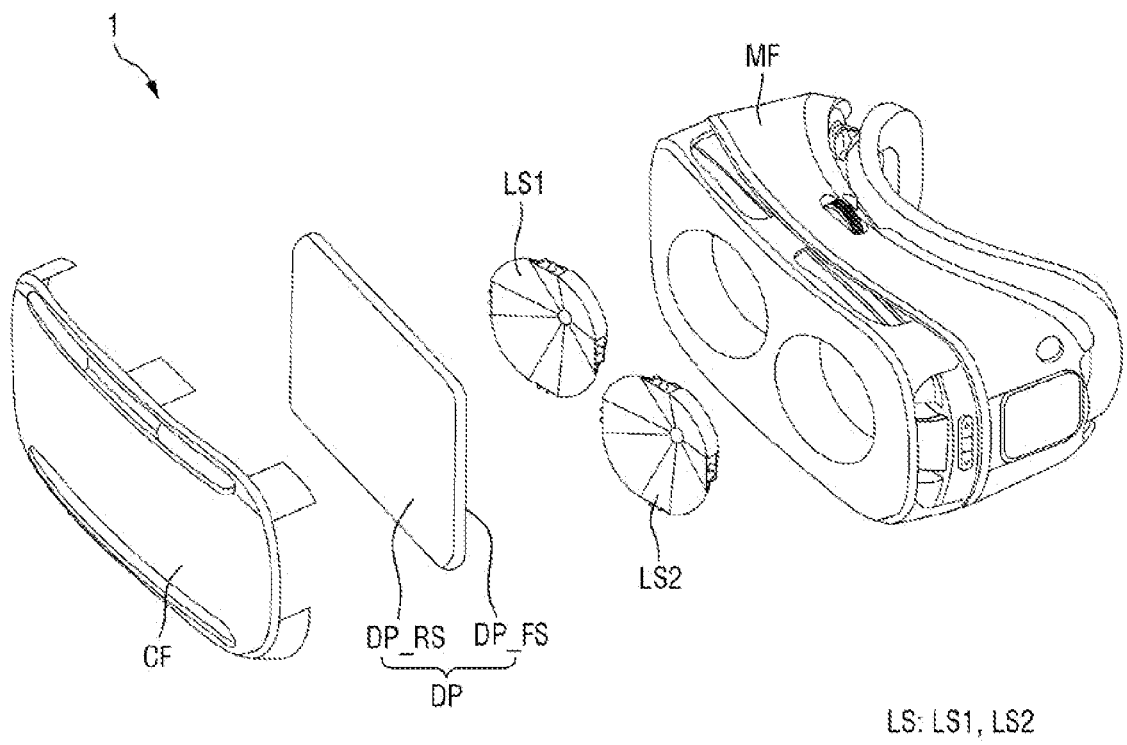
FIG. 1 is a perspective view of a display device according to an embodiment.

Embodiments of the present invention will be described more fully hereinafter with reference to the accompanying drawings. Like reference numerals may refer to like elements throughout the accompanying drawings.

It will be understood that when a component such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Other uses of these terms and similar terms to describe the relationships between components should be interpreted in a like fashion.

FIG. 1 is a perspective view of a display device 1 according to an embodiment.

The display device 1 to be described below may include a head-mounted display that is mounted on a user's head to provide a screen on which an image or a video is displayed to the user.

Head-mounted displays may include a see-through type head-mounted display that provides augmented reality (AR) based on actual external objects, and a see-closed type head-mounted display that provides virtual reality (VR) to a user with a screen independent from external objects. A see-closed type head-mounted display will be described below as an example. However, embodiments of the present disclosure are not limited thereto.

Referring to FIG. 1, the display device 1 may include a main frame MF, a display unit DP, multi-channel lenses LS including a first lens LS1 and a second lens LS2, and a cover frame CF.

The main frame MF may be worn on a user's head, and may have a shape corresponding to the shape of the user's head.

The first lens LS1, the second lens LS2, the display unit DP, and the cover frame CF may be mounted on the main frame MF. The main frame MF may include a space or structure in which the display unit DP, the first lens LS1, and the second lens LS2 can be accommodated. In an embodiment, the main frame MF may further include a structure such as a strap or a band to affix the main frame MF to the user's head. In an embodiment, a control unit, an image processing unit and a lens housing unit may be further mounted on the main frame MF.

The display unit DP displays an image and/or a video. The display unit DP may include a front surface DP_FS on which an image and/or a video is displayed and a rear surface DP_RS which is opposite the front surface DP_FS. Light for providing an image and/or a video may be emitted from the front surface DP_FS of the display unit DP. Thus, the front surface DP_FS may be described as a surface that emits light. As will be described below, the first lens LS1 and the second lens LS2 may be disposed on the front surface DP_FS of the display unit DP, and a plurality of camera sensors IFR_C1 and IFR_C2 (see FIGS. 4 and 5) may be disposed on the rear surface DP_RS of the display unit DP.

The display unit DP may be fixed to the main frame MF or may be detachable from the main frame MF. The display unit DP may be opaque, transparent, or translucent according to the design of the display device 1, for example, the type of the display device 1. The display unit DP may include an electronic component such as a display module including a display panel. which will be described below, or may include a display device such as a mobile terminal including a display panel.

The display unit DP may include a display panel for displaying an image or a video.

The display panel may be a light emitting display panel including light emitting elements. For example, the display panel may be an organic light emitting display panel using organic light emitting diodes that include organic light emitting layers, a micro light emitting diode display panel using micro light emitting diodes, a quantum dot light emitting display panel using quantum dot light emitting diodes that include quantum dot light emitting layers, or an inorganic light emitting display panel using inorganic light emitting elements that include inorganic semiconductors. An organic light emitting display panel will be described below as an example of the display panel. However, embodiments of the present disclosure are not limited thereto.

The multi-channel lenses LS may provide light emitted from the display unit DP to a user by allowing the light to pass therethrough. The multi-channel lenses LS may provide a plurality of channels through which the light emitted from the display unit DP passes. The channels may provide the light emitted from the display unit DP to the user by allowing the light to pass through different paths. The light emitted from the display unit DP may be incident on each of the channels. Thus, an enlarged image may be focused on the user's eyes.

In an embodiment, each of the multi-channel lenses LS is exemplified as a focusing optical system interposed between a user's eye and the front surface DP_FS of the display unit DP. However, embodiments of the present disclosure are not limited thereto. The focusing optical system may also include various types of lenses such as, for example, a convex lens, a concave lens, a spherical lens, an aspherical lens, a single lens, a compound lens, a standard lens, a narrow angle lens, a wide angle lens, a fixed focus lens, and a variable focus lens.

The first lens LS1 and the second lens LS2 of the multi-channel lenses LS may be disposed on the front surface DP_FS of the display unit DP. The first lens LS1 and the second lens LS2 may be arranged on the front surface DP_FS of the display unit DP to correspond to positions of left and right eyes of a user. The first lens LS1 and the second lens LS2 may be accommodated in the main frame MF.

The first lens LS1 and the second lens LS2 may reflect and/or refract light for providing an image and/or a video displayed on the display unit DP and provide the reflected and/or refracted light to the user. As will be described below, a plurality of light sources through IFR_L8 (see FIG. 2) may be disposed on a side of the first lens LS1 and a side of the second lens LS2 which face the main frame MF (the user's eyes).

The cover frame CF may be disposed on the rear surface DP_RS of the display unit DP and may protect the display unit DP. A plurality of infrared cameras IFR_C1 and IFR_C2 (see FIGS. 4 and 5) to be described below may be interposed between the cover frame CF and the display unit DP. However, embodiments of the present disclosure are not limited thereto.

In an embodiment, the display device 1 may further include a control unit which controls the overall operation of the display device 1.

Figure 4:
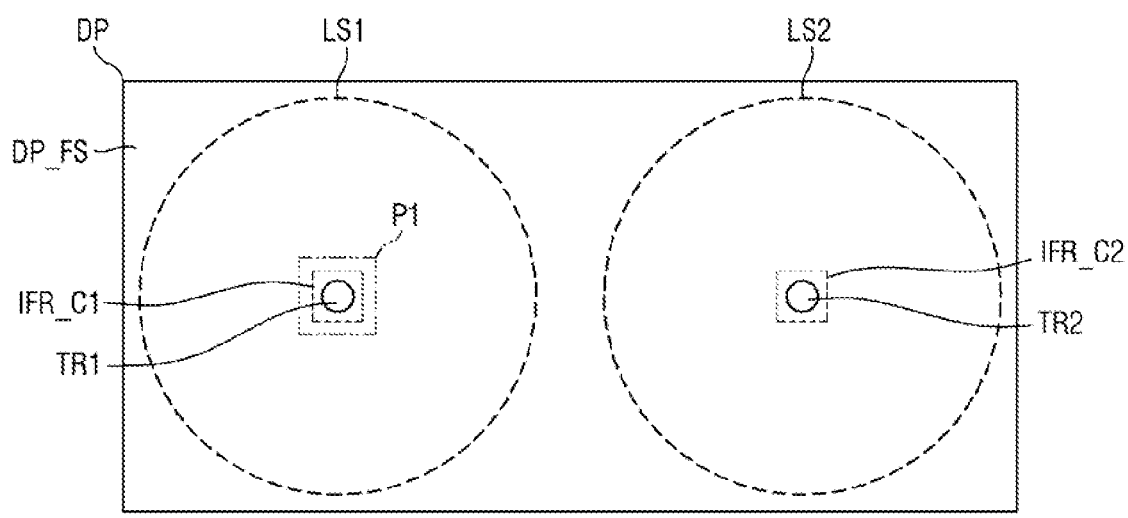
FIG. 4 is a plan view of a display unit according to an embodiment.
Figure 5:
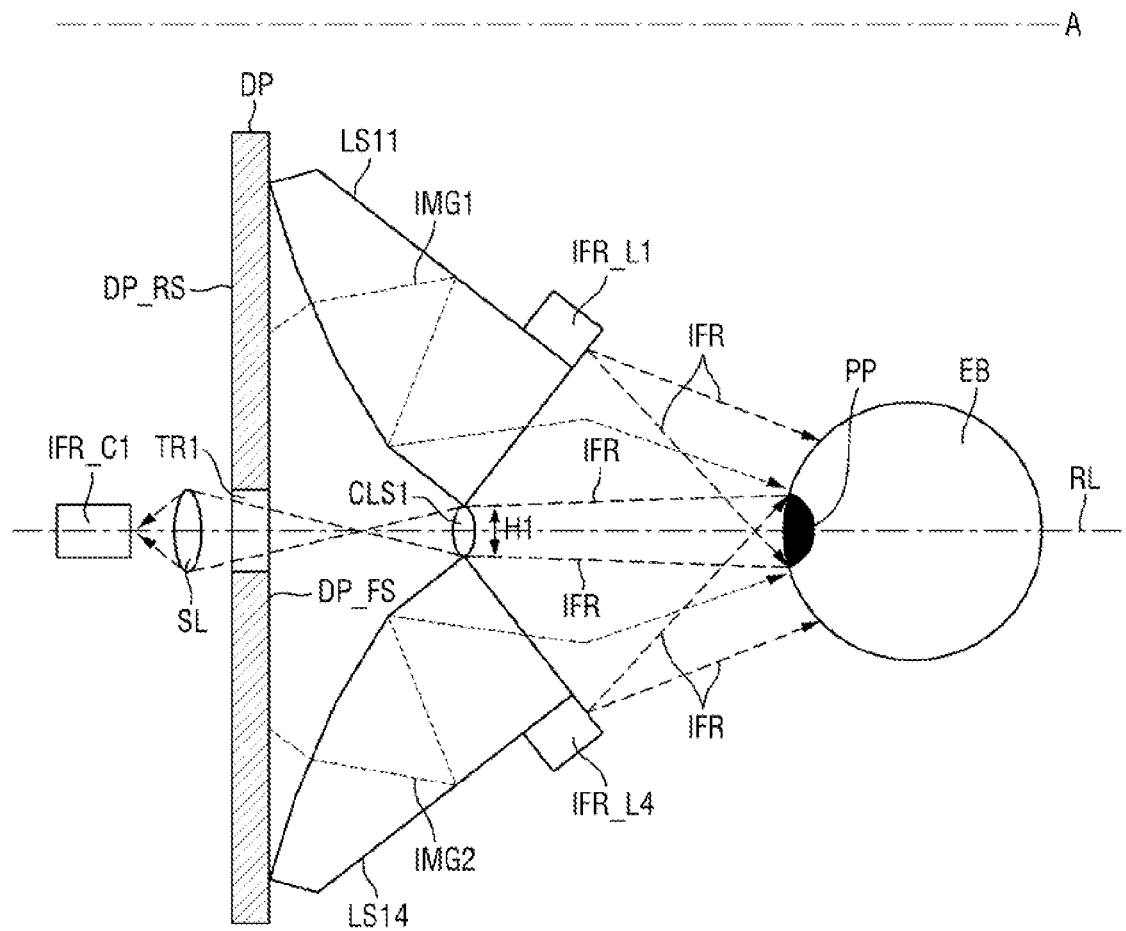
FIG. 5 is a cross-sectional view taken along line A-A' of FIG. 2 according to an embodiment.

The control unit may control the operation of at least one of the display unit DP, the infrared light sources IFR_L1 through IFR_L8 (see FIG. 2), and the infrared cameras IFR_C1 and IFR_C2 (see FIGS. 4 and 5). The control unit may perform operations to analyze images obtained by the infrared cameras IFR_C1 and IFR_C2 (see FIGS. 4 and 5), calculate the position of a user's pupils PP (see FIG. 5), calculate the user's gaze direction, perform image processing (image mapping) based on the position of the user's pupils PP (gaze direction), and display an image processed by the display unit DP.

The control unit may be implemented as, but is not limited to, a dedicated processor including an embedded processor and/or a general-use processor including a central processing unit or an application processor.

Figure 2:
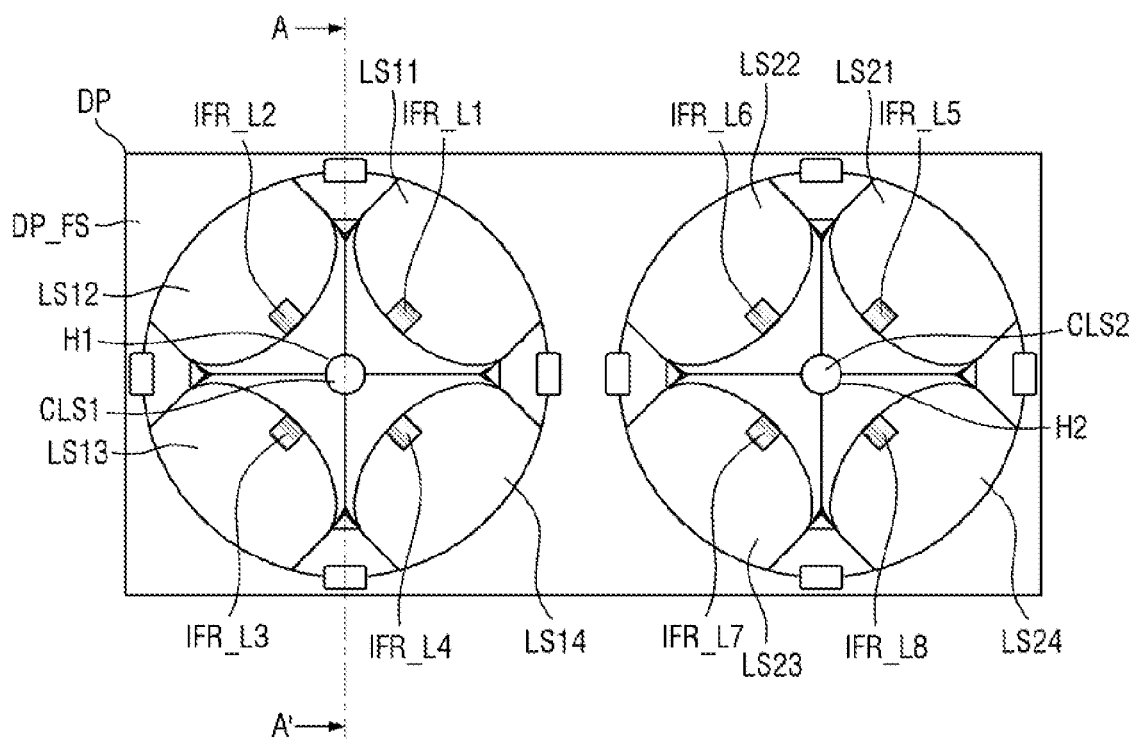
FIG. 2 is a plan view of a plurality of lenses and a display unit according to an embodiment.
Figure 3:
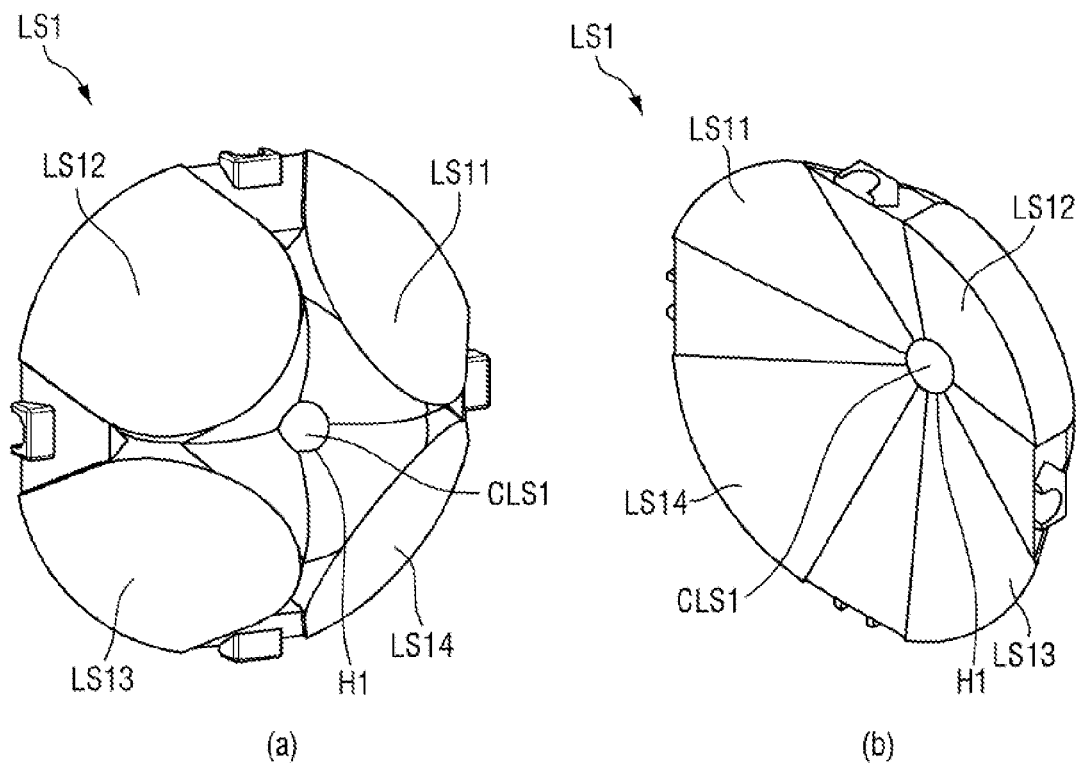
FIG. 3 is a perspective view of a first lens according to an embodiment.
Figure 6:
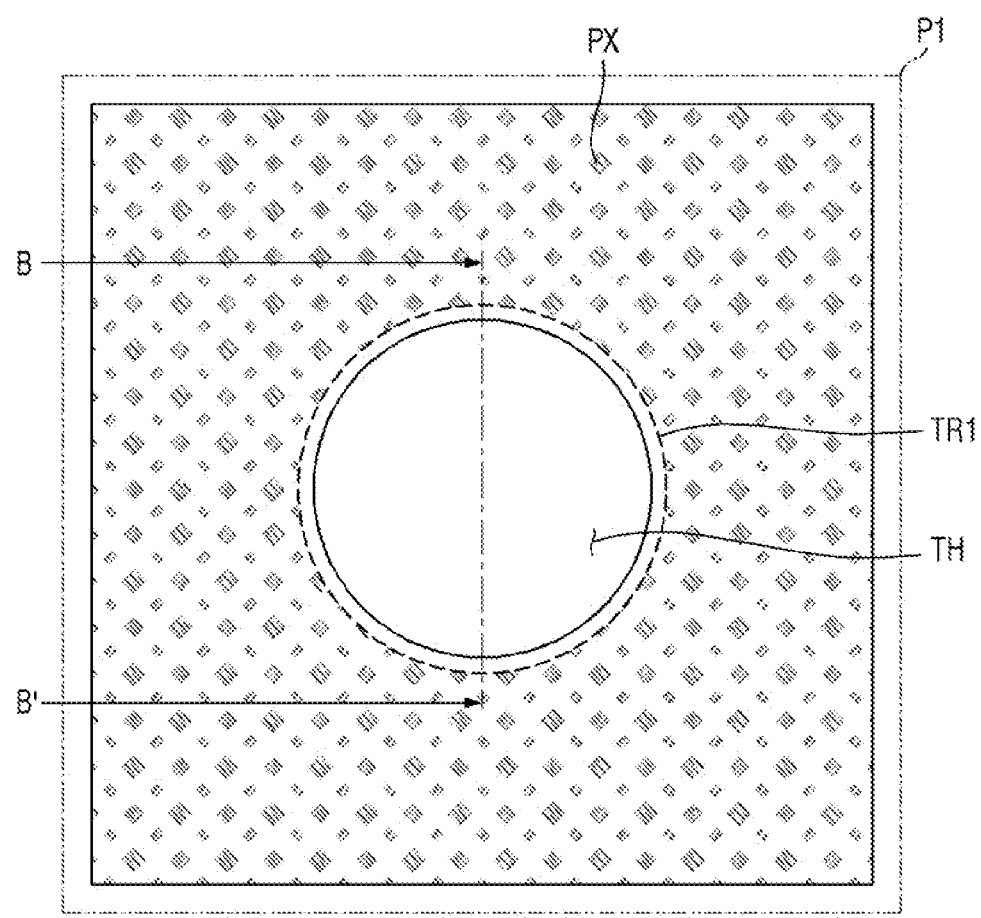
FIG. 6 is a plan view of part P1 of FIG. 4 according to an embodiment.
Figure 7:
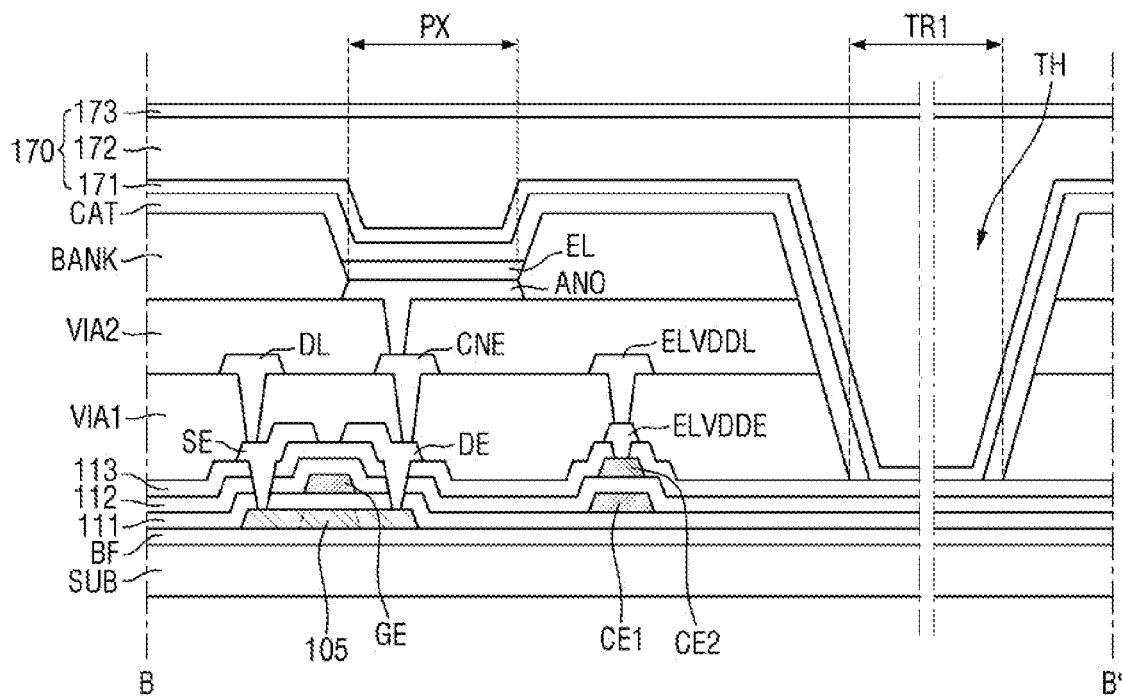
FIG. 7 is a cross-sectional view taken along line B-B' of FIG. 6 according to an embodiment.

FIG. 2 is a plan view of a plurality of lenses and a display unit DP according to an embodiment. FIG. 3 is a perspective view of a first lens LS1 according to an embodiment. FIG. 4 is a plan view of the display unit DP according to an embodiment. FIG. 5 is a cross-sectional view taken along line A-A' of FIG. 2 according to an embodiment. FIG. 6 is a plan view of part P1 of FIG. 4 according to an embodiment. FIG. 7 is a cross-sectional view taken along line B-B' of FIG. 6 according to an embodiment.

Referring to FIGS. 1 and 2, as illustrated in FIG. 2, the first lens LS1 and the second lens LS2 may be disposed on the front surface DP_FS of the display unit DP and may be located at positions corresponding to each of a user's eyes, respectively.

For example, the display unit DP may have a substantially rectangular shape that is long (extends lengthwise) in a left-right direction (a horizontal direction in FIG. 2) in a plan view, the first lens LS1 may be located on one side (a left side in FIG. 2) on the front surface DP_FS of the display unit DP, and the second lens LS2 may be located on the other side (a right side in FIG. 2) on the front surface DP_FS of the display unit DP. In an embodiment, the first lens LS1 and the second lens LS2 may be disposed symmetrically with respect to the center of the display unit DP and may have substantially the same or a similar structure. However, embodiments of the present disclosure are not limited thereto.

Referring to FIGS. 2, 3 and 5, first lens LS1 may include a plurality of sub-lenses LS11 through LS14 and the second lens LS2 may include a plurality of sub-lenses LS21 through LS24. Each of the sub-lenses LS11 through LS14 may include a lenslet that forms a part of the first lens LS1, and each of the sub-lenses LS21 through LS24 may include a lenslet that forms a part of the second lens LS2.

In an embodiment, the first lens LS1 may include a first sub-lens LS11, a second sub-lens LS12, a third sub-lens LS13, and a fourth sub-lens LS14. The second lens LS2 may include a fifth sub-lens LS21, a sixth sub-lens LS22, a seventh sub-lens LS23, and an eighth sub-lens LS24. However, the number of sub-lenses LS11 through LS14 and LS21 through LS24 is not limited thereto.

In an embodiment, the second lens LS2 is substantially the same as or similar to the first lens LS1. Therefore, for convenience of explanation, the first lens L1 will be mainly described below, and a redundant description of the second lens L2 will be omitted.

Referring to FIG. 2, the first lens LS1 may have a substantially circular shape in a plan view. The first sub-lens LS11, the second sub-lens LS12, the third sub-lens LS13, and the fourth sub-lens LS14 may be arranged, for example, in a clover shape to surround the center of the circular shape in a plan view.

For example, as illustrated in FIG. 2, the first sub-lens LS11, the second sub-lens LS12, the third sub-lens LS13, and the fourth sub-lens LS14 may be disposed on upper right, upper left, lower left, and lower right sides of the center of the first lens LS1, respectively. The first sub-lens LS11, the second sub-lens LS12, the third sub-lens LS13, and the fourth sub-lens LS14 may be integrally connected to each other or may be separated from each other.

Part (a) of FIG. 3 is a perspective view of a side of the first lens LS1 which faces a user's eye. part (b) of FIG. 3 is a perspective view of the other side of the first lens LS1 which faces the display unit DP.

Referring to FIG. 3, the first lens LS1 may have a substantially hemispherical shape. A side of the first lens LS1 which faces the main frame MF (or a user's eye) may have a convex shape, and the other side of the first lens LS1 which faces the display unit DP may have a concave shape.

Referring to FIGS. 2 and 3, a first hole H1 penetrating the first lens LS1 may be disposed at the center of the first lens LS1.

The first hole H1 may penetrate the first lens LS1 in a thickness direction. The thickness direction may be a thickness direction of the display unit DP, a direction in which a user gazes at the display unit DP, and/or a direction substantially perpendicular to the front surface DP_FS of the display unit DP (a rear surface of the display unit DP). In a plan view, the first hole H1 may be located at the center of the first lens LS1 and may be surrounded by the first sub-lens LS11, the second sub-lens LS12, the third sub-lens LS13, and the fourth sub-lens LS14. As will be described below, light reflected from a user's pupil PP (see FIG. 5) may pass through the first hole HE For example, the first hole H1 may have a circular shape in a plan view, and a diameter of the first hole H1 may be about 0.5 mm. However, the shape and size of the first hole H1 are not limited thereto.

A first center lens CLS1 may be disposed in the first hole H1. The first center lens CLS1 may be mounted in the first hole HE The first center lens CLS1 may include various types of lenses such as, for example, a convex lens and a concave lens. The first center lens CLS1 may cause light IFR (see FIG. 5) reflected from a user's pupil PP (see FIG. 5) to be focused on a first camera sensor IFR_C1 by appropriately refracting and/or reflecting the light IFR, thereby reducing the thickness of the display device 1. However, embodiments of the present disclosure are not limited thereto. In an embodiment, the first hole H1 may remain empty (e.g., may be filled with air).

Still referring to FIGS. 2 and 3, like the first lens LS1 and the second lens LS2 may have a substantially hemispherical shape. The fifth sub-lens LS21, the sixth sub-lens LS22, the seventh sub-lens LS23, and the eight sub-lens LS24 of the second lens LS2 may be arranged, for example, in a clover shape to surround the center of the second lens LS2 in a plan view. Like the first hole H1 of the first lens LS1, a second hole H2 penetrating the second lens LS2 and surrounded by the fifth sub-lens LS21, the sixth sub-lens LS22, the seventh sub-lens LS23 and the eighth sub-lens LS24 may be disposed at the center of the second lens LS2. A second center lens CLS2, which is substantially the same as or similar to the first center lens CLS1, may be disposed in the second hole H2, or the second hole H2 may remain empty (e.g., may be filled with air).

Still referring to FIGS. 2, 3 and 5, the sub-lenses LS11 through LS14 and LS21 through LS24 may respectively provide a plurality of channels through which light emitted from the front surface DP_FS of the display unit DP passes. Light emitted from different areas of the front surface DP_FS of the display unit DP may pass through the channels through different paths. The sub-lenses LS11 through LS14 and LS21 through LS24 may magnify the light emitted from different areas of the front surface DP_FS of the display unit DP to have the same magnification ratio or to have different magnification ratios. The light passing through each of the sub-lenses LS11 through LS14 and LS21 through LS24 may include a partial video and/or a partial image for forming a complete VR image (or a complete VR video) and may be focused on a user's pupil PP to provide one complete VR image (or a complete VR video) to the user.

For example, as illustrated in FIG. 5, the first sub-lens LS11 may provide a channel through which light IMG1 emitted from an area of the display unit DP (e.g., an upper part of the display unit DP of FIG. 5) passes, and the fourth sub-lens LS14 may provide a channel through which light IMG2 emitted from another area of the display unit DP (e.g., a lower part of the display unit DP of FIG. 5) passes. The above-described areas of the display unit DP may respectively include an area overlapping the first sub-lens LS11 and an area overlapping the fourth sub-lens LS14 in the thickness direction.

Similarly, in an embodiment, the second sub-lens LS12 and the third sub-lens LS13, like the first sub-lens LS11 and the fourth sub-lens LS14, may respectively provide channels through which light emitted from different areas of the display unit DP pass.

In an embodiment, light passing through each of the sub-lenses LS11 through LS14 and LS21 through LS24 may be provided to a user through two refractions and two reflections. However, embodiments of the present disclosure are not limited thereto.

Referring to FIGS. 2 and 5, the display device 1 may further include a plurality of light sources IFR_L1 through IFR_L8.

The light sources IFR_L1 through IFR_L8 may be disposed on the first lens LS1 and the second lens LS2. The light sources IFR_L1 through IFR_L8 may be disposed on a convex side of the first lens LS1 and a convex side of the second lens LS2 which face the main frame MF (or a user's eyes).

The light sources IFR_L1 through IFR_L8 may emit light IFR for detecting the position of a user's pupils PP (see FIG. 5). The light sources IFR_L1 through IFR_L8 may emit, for example, infrared light or visible light. However, embodiments of the present disclosure are not limited thereto.

The light sources IFR_L1 through IFR_L8 may include a first light source IFR_L1, a second light source IFR_L2, a third light source IFR_L3, a fourth light source IFR_L4, a fifth light source IFR_L5, a sixth light source IFR_L6, a seventh light source IFR_L7, and an eighth light source IFR_L8.

The first light source IFR_L1, the second light source IFR_L2, the third light source the fourth light source the fifth light source IFR_L5, the sixth light source IFR_L6, the seventh light source IFR_L7, and the eighth light source IFR_L8 may be disposed on the first sub-lens LS11, the second sub-lens LS12, the third sub-lens LS13, the fourth sub-lens LS14, the fifth sub-lens LS21, the sixth sub-lens LS22, the seventh sub-lens LS23, and the eighth sub-lens LS24, respectively.

As illustrated, in an embodiment, eight light sources IFR_L1 through IFR_L8 are disposed on the sub-lenses LS11 through LS14 and LS21 through LS24, respectively. However, embodiments of the present disclosure are not limited thereto. For example, according to embodiments, the number of light sources IFR_L1 through IFR_L8 may be greater than or less than eight, and the light sources IFR_L1 through IFR_L8 may be disposed only on some of the sub-lenses LS11 through LS14 and LS21 through LS24.

As illustrated in FIG. 2, the first light source IFR_L1, the second light source IFR_L2, the third light source IFR_L3, and the fourth light source IFR_L4 may be located inside a boundary of the first lens LS1 and may surround the center of the first lens LS1 and/or the first hole H1 in a plan view. The fifth light source IFR_L5, the sixth light source IFR_L6, the seventh light source IFR_L7, and the eighth light source IFR_L8 may be located inside a boundary of the second lens LS2 and may surround the center of the second lens LS2 and/or the second hole H2 in a plan view.

As illustrated in FIG. 5, in a cross-sectional view, the first light source IFR_L1 and the fourth light source IFR_L4 may be disposed on an inclined surface of the first sub-lens LS11 and an inclined surface of the fourth sub-lens LS14, respectively. The inclined surface of the first sub-lens LS11 and the inclined surface of the fourth sub-lens LS14 may extend from the display unit DP toward a user's eyeball EB such that a width of the first lens LS1 is reduced. The width of the first lens LS1 may be a width measured in the thickness direction and/or a direction intersecting the user's gaze direction, for example, a vertical direction in FIG. 5.

Similarly, in an embodiment, the second light source IFR_L2 and the third light source IFR_L3 may be disposed on the second sub-lens LS12 and the third sub-lens LS13 in substantially the same or a similar manner as the first light source and the fourth light source IFR_L4, respectively. In addition, the fifth light source IFR_L5, the sixth light source IFR_L6, the seventh light source IFR_L7, and the eighth light source IFR_L8 may be disposed on the fifth sub-lens LS21, the sixth sub-lens LS22, the seventh sub-lens LS23, and the eighth sub-lens LS24 in substantially the same or a similar manner as the first light source the second light source the third light source IFR_L3, and the fourth light source IFR_L4, respectively.

Referring to FIGS. 4 and 5, the display device 1 may further include the camera sensors IFR_C1 and IFR_C2. Although two camera sensors are exemplified as the camera sensors IFR_C1 and IFR_C2 according to an embodiment, embodiments of the present disclosure are not limited thereto.

The camera sensors IFR_C1 and IFR_C2 may be disposed on the rear surface of the display unit DP. The camera sensors IFR_C1 and IFR_C2 may include various types of cameras or image sensors capable of detecting light IFR reflected from a user's pupils PP. The camera sensors IFR_C1 and IFR_C2 may capture an image ahead. The position of the user's pupils PP and the user's gaze direction may be calculated based on the captured image. In an embodiment, each of the camera sensors IFR_C1 and IFR_C2 may be, but is not limited to, an infrared camera.

The first camera sensor IFR_C1 may overlap the first lens LS1 and the second camera sensor IFR_C2 may overlap the second lens LS2.

As illustrated in FIG. 4, the first camera sensor and the second camera sensor IFR_C2 may respectively overlap the center of the first lens LS1 and the center of the second lens LS2 in the thickness direction in a plan view. The first camera sensor IFR_C1 and the second camera sensor IFR_C2 may be disposed on the rear surface DP_RS of the display unit DP to overlap a first transmission area TR1 and a second transmission area TR2 to be described below, respectively.

As illustrated in FIG. 5, the first camera sensor may overlap the first hole H1 in the thickness direction in a cross-sectional view. The first camera sensor may overlap a virtual reference line RL passing through the first center lens CLS1, the first hole H1, and the center of a user's eyeball EB. Similarly, in an embodiment, the second camera sensor IFR_C2 may overlap the second hole H2 in the thickness direction in a cross-sectional view.

Still referring to FIG. 5, the display device 1 may further include a first sensor lens SL interposed between a camera sensor and the display unit DP.

As illustrated in FIG. 5, in a cross-sectional view, the first sensor lens SL may be interposed between the first camera sensor IFR_C1 and the first transmission area TR1, which will be described further below. The first sensor lens SL may refract and/or reflect light IFR passing through the first transmission area TR1 to enter the first camera sensor IFR_C1. The first sensor lens SL may include various types of lenses such as, for example, a convex lens and a concave lens.

The first sensor lens SL may include a focusing optical system which may focus infrared light reflected from a user's pupil PP onto the first camera sensor IFR_C1. The first sensor lens SL may also form the focusing optical system together with the first center lens CLS1. Similarly, in an embodiment, the display device 1 may further include a second sensor lens disposed between the second camera sensor IFR_C2 and the second transmission area TR2 and focusing light IFR passing through the second transmission area TR2, which will be described further below, onto the second camera sensor IFR_C2.

Referring to FIGS. 4, 5, 6 and 7, the display device 1 may include a plurality of transmission areas including the first transmission area TR1 and the second transmission area TR2. Although two transmission areas TR1 and TR2 are exemplified as the transmission areas TR1 and TR2, embodiments of the present disclosure are not limited thereto.

The transmission areas TR1 and TR2 may transmit most of the light incident on the front surface DP_FS of the display unit DP. The transmission areas TR1 and TR2 may selectively transmit light in a specific wavelength region, for example, infrared light. However, embodiments of the present disclosure are not limited thereto. Light IFR transmitted through the transmission areas TR1 and TR2 may be sent to the camera sensors and IFR_C2 disposed on the rear surface DP_RS of the display unit DP.

The first transmission area TR1 may overlap the first lens LS1 and the second transmission area TR2 may overlap the second lens LS2.

As illustrated in FIG. 4, in a plan view, the first transmission area TR1 and the second transmission area TR2 may overlap the center of the first lens LS1 and the center of the second lens LS2 in the thickness direction, respectively.

As illustrated in FIG. 5, the first transmission area TR1 may overlap the first camera sensor IFR_C1 and the first hole H1 (the first center lens CLS1) in the thickness direction in a cross-sectional view. The first transmission area TR1 may be interposed between the first hole H1 (the first center lens CLS1) and the first camera sensor IFR_C1. The first transmission area TR1 may overlap the virtual reference line RL passing through the first camera sensor IFR_C1, the first hole H1 (the first center lens CLS1), and the center of a user's eyeball EB. Similarly, in an embodiment, the second transmission area TR2 may overlap the second camera sensor IFR_C2 and the second hole H2 (the second center lens CLS2) in the thickness direction in a cross-sectional view.

In an embodiment, the transmission areas TR1 and TR2 have substantially the same or a similar structure. Therefore, for convenience of explanation, the first transmission area TR1 will be mainly described below, and a redundant description of the second transmission area TR2 will be omitted.

Referring to FIG. 6, the display unit DP may include a plurality of pixels PX. In an embodiment, at least some of the pixels PX are not disposed in the first transmission area TR1. That is, in an embodiment, at least some of the pixels PX may be removed from the first transmission area TR1.

In an embodiment, the pixels PX are not disposed in the first transmission area TR1, and a transmission hole TH penetrating at least some of a plurality of layers constituting the display unit DP may be formed. The transmission hole TH may denote a window through which light in a specific wavelength region, for example, infrared light, passes. In FIG. 6, the transmission hole TH may have a circular shape in a plan view. However, embodiments of the present disclosure are not limited thereto.

Referring to FIG. 7, the display unit DP may include the display panel as described above.

The display panel may include a substrate SUB, a plurality of conductive layers disposed on the substrate SUB, a plurality of insulating layers 111, 112, 113, VIA1 and VIA2 insulating the conductive layers from each other, and a light emitting layer EL.

The substrate SUB may be disposed over a display area and a non-display area. The substrate SUB may be a flexible substrate SUB including a flexible material such as flexible glass or polyimide. In FIG. 7, the substrate SUB is illustrated as a single layer. However, embodiments of the present disclosure are not limited thereto. In an embodiment, the substrate SUB may include a plurality of layers, for example, a plurality of polyimide substrate layers and at least one barrier layer interposed therebetween.

A buffer layer BF may be disposed on the substrate SUB. The buffer layer BF may prevent penetration of moisture and oxygen from outside of the display unit through the substrate SUB. The buffer layer BF may include any one of, for example, a silicon nitride (SiNx) layer, a silicon oxide ($SiO_2$) layer, and a silicon oxynitride (SiOxNy) layer.

A semiconductor layer 105 may be disposed on the buffer layer BFF. The semiconductor layer 105 forms a channel of a thin-film transistor (TFT). The semiconductor layer 105 may be disposed in each pixel PX of the display area and, in some cases, may also be disposed in the non-display area. The semiconductor layer 105 may include polycrystalline silicon.

A first insulating layer 111 may be disposed on the semiconductor layer 105. The first insulating layer 111 may be disposed over the entire substrate SUB. The first insulating layer 111 may be a gate insulating film having a gate insulating function.

The first insulating layer 111 may include, for example, a silicon compound, a metal oxide, or the like. For example, the first insulating layer 111 may include silicon oxide, silicon nitride, silicon oxynitride, aluminum oxide, tantalum oxide, hafnium oxide, zirconium oxide, titanium oxide, and the like. These materials may be used alone or in combination with each other.

A first conductive layer among the plurality of conductive layers may be disposed on the first insulating layer 111. The first conductive layer ay include a gate electrode GE of the thin-film transistor TFT and a first electrode CE1 of a storage capacitor. In an embodiment, a plurality of gate electrodes GE may be disposed with at least one insulating layer interposed between them.

The first conductive layer may include one or more metals selected from, for example, molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The first conductive layer 120 may be a single layer or a stacked layer made of any one or more of the above-described materials.

A second insulating layer 112 may be disposed on the first conductive layer. The second insulating layer 112 may insulate the first conductive layer from a second conductive layer among the plurality of conductive layers. The second insulating layer 112 may be selected from the example materials described above with reference to the first insulating layer 111.

The second conductive layer may be disposed on the second insulating layer 112. The second conductive layer may include a second electrode CE2 of the storage capacitor. The material of the second conductive layer may be selected from the example materials of the first conductive layer described above. The first electrode CE1 of the storage capacitor and the second electrode CE2 of the storage capacitor may form a capacitor through the second insulating layer 112.

A third insulating layer 113 may be disposed on the second conductive layer. The third insulating layer 113 may include at least one of the example materials of the first insulating layer 111 described above. In some embodiments, the third insulating layer 113 may include an organic insulating material. The organic insulating material may be selected from example materials of a first via layer VIA1 to be described below.

A third conductive layer may be disposed on the third insulating layer 113. The third conductive layer may include a source electrode SE, a drain electrode DE, a high potential voltage electrode ELVDDE, and a signal line pad.

The third conductive layer may include at least any one of, for example, molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The third conductive layer may be a single layer made of any one of the above example materials. However, embodiments of the present disclosure are not limited thereto. For example, in an embodiment, the third conductive layer may be a stacked layer. For example, the third conductive layer may have a stacked structure of Ti/Al/Ti, Mo/Al/Mo, Mo/AlGe/Mo, or Ti/Cu. In an embodiment, the third conductive layer may include Ti/Al/Ti.

The first via layer VIA1 may be disposed on the third conductive layer. The first via layer VIA1 may include an organic insulating material. The organic insulating material may include at least any one of, for example, polyacrylates resin, epoxy resin, phenolic resin, polyamides resin, polyimides resin, unsaturated polyesters resin, polyphenylenethers resin, polyphenylenesulfides resin, and benzocyclobutene (BCB).

A fourth conductive layer may be disposed on the first via layer VIAL The forth conductive layer may include a data line DL, a connection electrode CNE, and a high potential voltage line ELVDDL. The data line DL may be electrically connected to the source electrode SE of the thin-film transistor TFT through a contact hole penetrating the first via layer VIAL The connection electrode CNE may be electrically connected to the drain electrode DE of the thin-film transistor TFT through a contact hole penetrating the first via layer VIAL The high potential voltage line ELVDDL may be electrically connected to the high potential voltage electrode ELVDDE through a contact hole penetrating the first via layer VIAL The fourth conductive layer may include a material selected from the example materials of the third conductive layer.

A second via layer VIA2 may be disposed on the fourth conductive layer. The second via layer VIA2 may include at least one of the example materials of the first via layer VIA1 described above.

An anode ANO may be disposed on the second via layer VIA2. The anode ANO may be electrically connected to the connection electrode CNE through a contact hole penetrating the second via layer VIA2.

A bank layer BANK may be disposed on the anode ANO. The bank layer BANK may include a contact hole exposing the anode ANO. The bank layer BANK may be made of an organic insulating material or an inorganic insulating material. For example, the bank layer BANK may include at least one of a photoresist, polyimide resin, acrylic resin, a silicone compound, and polyacrylic resin. As illustrated in FIG. 7, a pixel PX may be defined by an opening of the bank layer BANK which exposes the light emitting layer EL.

The light emitting layer EL may be disposed on an upper surface of the anode ANO and in the opening of the bank layer BANK. A cathode CAT is disposed on the light emitting layer EL and the bank layer BANK. The cathode CAT may be a common electrode disposed over the pixels PX.

A thin-film encapsulation layer 170 may be disposed on the cathode CAT. The thin-film encapsulation layer 170 may cover an organic light emitting diode (OLED). The thin-film encapsulation layer 170 may be a stacked layer in which an inorganic layer and an organic layer are alternately stacked. For example, the thin-film encapsulation layer 170 may include a first encapsulating inorganic layer 171, an encapsulating organic layer 172, and a second encapsulating inorganic layer 173 stacked sequentially.

In an embodiment, the display panel may further include an under-panel sheet disposed on a lower surface of the substrate SUB. The under-panel sheet may include at least one functional layer such as, for example, a digitizer, a heat dissipation member, a shield member, and a buffer member.

Referring to FIGS. 4 through 7, the first transmission area TR1 may include the transmission hole TH as described above. The transmission hole TH may penetrate at least one of a plurality of layers constituting the display unit DP (the display panel) in the thickness direction.

In an embodiment, the transmission hole TH may penetrate the first via layer VIA1, the second via layer VIA2 and the bank BANK, and may expose the third insulating layer 113. In this case, the first encapsulating inorganic layer 171 may directly contact the third insulating layer 113, and the transmission hole TH may be filled with the encapsulating organic layer 172.

However, embodiments of the present disclosure are not limited thereto. For example, in an embodiment, the transmission hole TH may be formed to further penetrate at least one layer, for example, the third insulating layer 113 disposed under the first via layer VIA1, or may be formed to penetrate only up to the bank layer BANK and/or the first via layer VIA1. Alternatively, the transmission hole TH may be formed to completely penetrate the display panel.

The second transmission area TR2 has substantially the same or a similar structure as the first transmission area TR1, and thus, for convenience of explanation, a redundant description thereof is omitted.

In the display device 1 according to an embodiment, the light sources IFR_L1 through IFR_L8 are disposed on a side of the first lens LS1 and a side of the second lens LS2 adjacent to a user's eyeballs EB, and the camera sensors and IFR_C2 are disposed in front of the eyeballs EB to overlap the transmission areas TR1 and TR2 of the display unit DP. Therefore, according to an embodiment, performing error correction for images obtained by the camera sensors IFR_C1 and IFR_C2 may be omitted. In addition, when the user wears the display device 1, interference between the light sources IFR_L1 through IFR_L8 and the user and/or interference between the camera sensors IFR_C1 and IFR_C2 and the user may be prevented or reduced.

Figure 8:
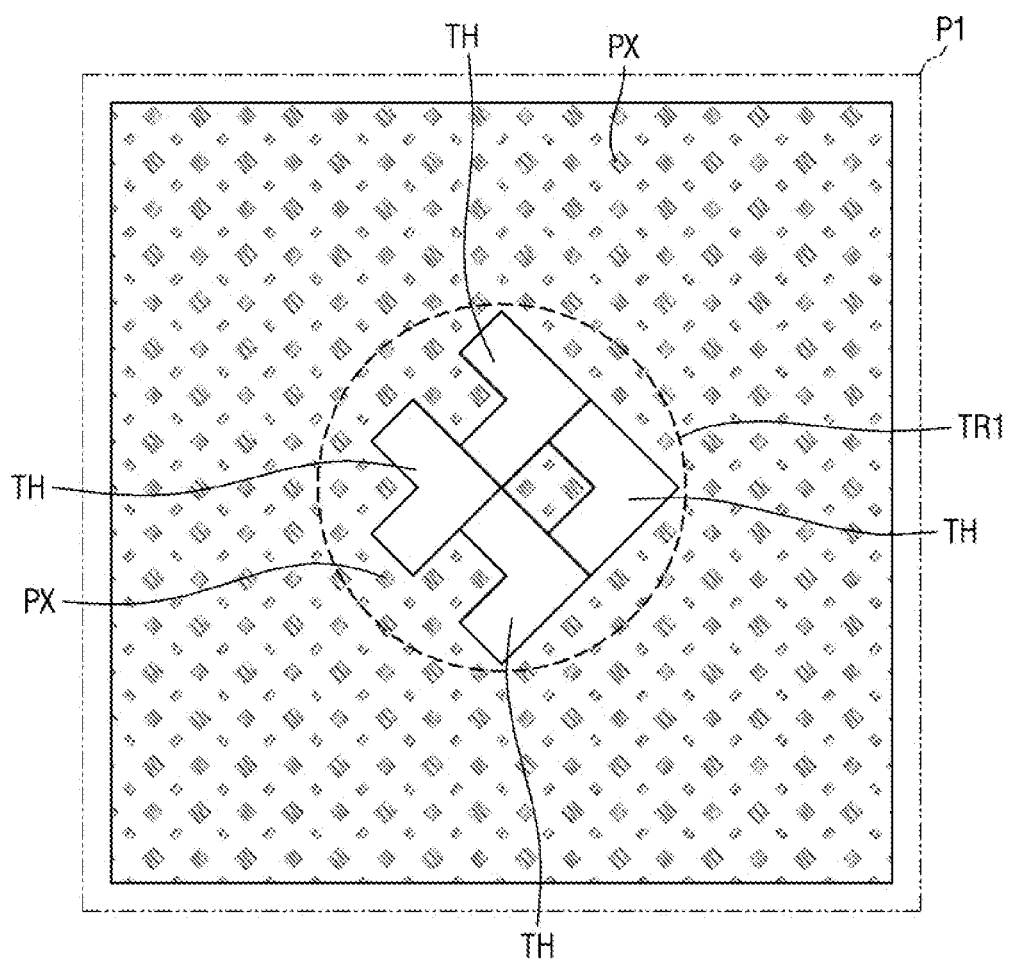
FIG. 8 is a plan view of part P1 of FIG. 4 according to an embodiment.

FIG. 8 is a plan view of part P1 of FIG. 4 according to an embodiment.

Referring to FIG. 8, at least one pixel PX may be disposed in the first transmission area TR1, unlike in the embodiment of FIG. 6. In other words, a plurality of pixels PX may be arranged at regular intervals, for example, in a lattice shape and/or a matrix shape in a plan view, but some of the pixels PX located in the first transmission area TR1 may be removed. That is, the number of pixels PX per unit area in the first transmission area TR1 may be smaller than that in an area excluding the first transmission area TR1 from an area in which the pixels PX of a display unit DP are disposed, for example, at least a part of a front surface DP_FS of the display unit DP (display panel).

The pixels PX located in the first transmission area TR1 may be removed in units of pixel groups. A pixel group may include pixels emitting light of different colors. For example, the pixel group may include one pixel emitting first light, one pixel emitting second light, and two pixels emitting third light. However, embodiments of the present disclosure are not limited thereto.

A plurality of transmission holes TH may be disposed in the first transmission area TR1. The pixels PX may be disposed between the transmission holes TH. The transmission holes TH may have substantially the same or a similar structure as the transmission hole TH of FIG. 7. Each of the transmission holes TH may have a substantially 'L' shape in a plan view. However, embodiments of the present disclosure are not limited thereto. The transmission holes TH may have various shapes such as, for example, a quadrangle, a triangle, a polygon, a circle, and an oval.

Similarly, in an embodiment, a plurality of pixels PX and a plurality of transmission holes TH disposed between pixels PX may be disposed in the second transmission area TR2.

An embodiment according to FIG. 8 is substantially the same as or similar to an embodiment according to FIGS. 1 through 7 except that the pixels PX are disposed in the first transmission area TR1. Thus, for convenience of explanation, a redundant description thereof is omitted.

Figure 9:
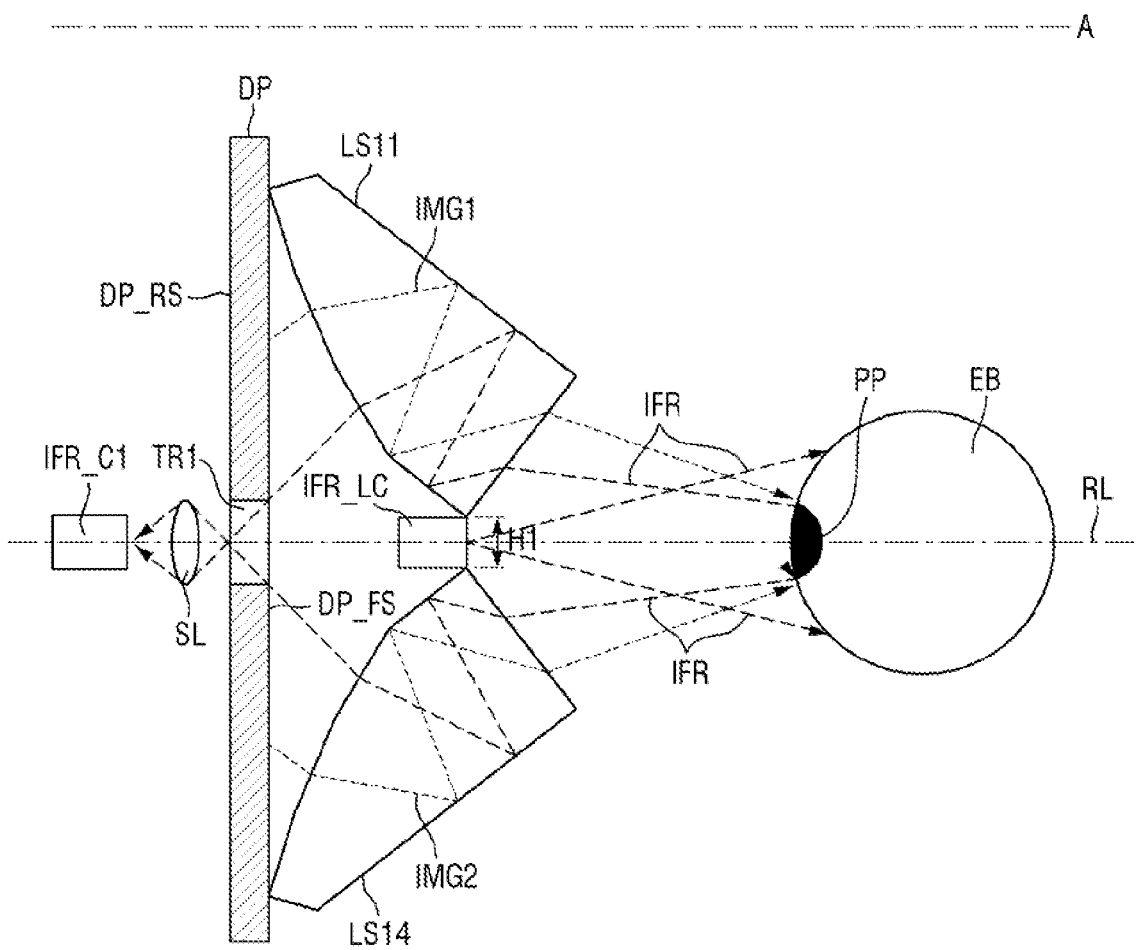
FIG. 9 is a cross-sectional view of a display device according to an embodiment.

FIG. 9 is a cross-sectional view of a display device according to an embodiment. For convenience of explanation, a further description of elements and technical aspects previously described with reference to FIG. 5 may be omitted.

Referring to FIG. 9, the plurality of light sources may further include a light source IFR_LC disposed in the first hole H1 of the first lens LS1. In this case, the first through fourth light sources IFR_L1 through LFR_L4 may be omitted. However, embodiments of the present disclosure are not limited thereto.

The light source IFR_LC may overlap the first hole H1 in the thickness direction in a cross-sectional view. The light source IFR_LC may overlap the virtual reference line RL passing through the first camera sensor the first transmission area TR1, the first hole H1, and the center of a user's eyeball EB in a cross-sectional view.

The light source IFR_LC may be mounted in the first hole H1 and may be disposed not to protrude from a side of the first lens LS1 adjacent to the user's eyeball EB toward the user's eyeball EB. The light source IFR_LC may be disposed in a space between the other side of the first lens LS1 facing the display unit DP and having a concave shape and a front surface of the display unit DP.

As described above, the light source IFR_LC may emit light for detecting the position of a pupil PP, for example, infrared light and/or ultraviolet light toward the user's eyeball EB.

In an embodiment, a light source IFR_LC which is substantially the same as or similar to the light source IFR_LC disposed in the first hole H1 may also be disposed in the second hole H2 of the second lens LS2.

As illustrated in FIG. 9, since the light source IFR_LC is disposed in the first hole H1, the angle of view of the first camera sensor IFR_C1 limited by the size of the first hole H1 and the size of the first sensor lens SL may be increased. In addition, since a smaller number of light sources IFR_LC are utilized in an embodiment according to FIG. 9 than in an embodiment according to FIGS. 1 through 7, effective arrangement of the light sources IFR_LC is possible.

An embodiment according to FIG. 9 is substantially the same as or similar to an embodiment according to FIGS. 1 through 7 except for the arrangement of the light sources IFR_LC, and thus, for convenience of explanation, a redundant description thereof is omitted.

Figure 10:
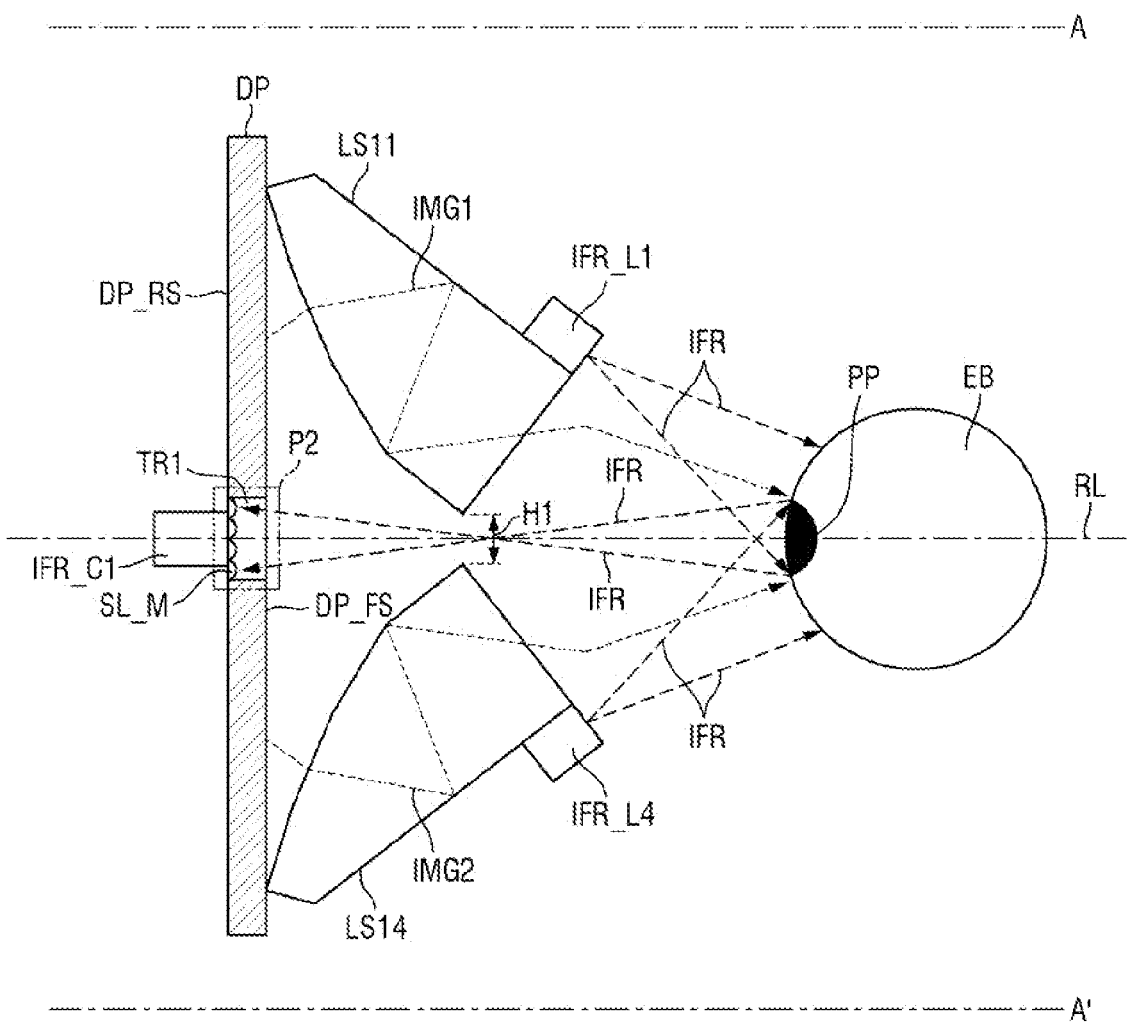
FIG. 10 is a cross-sectional view of a display device according to an embodiment.
Figure 11:
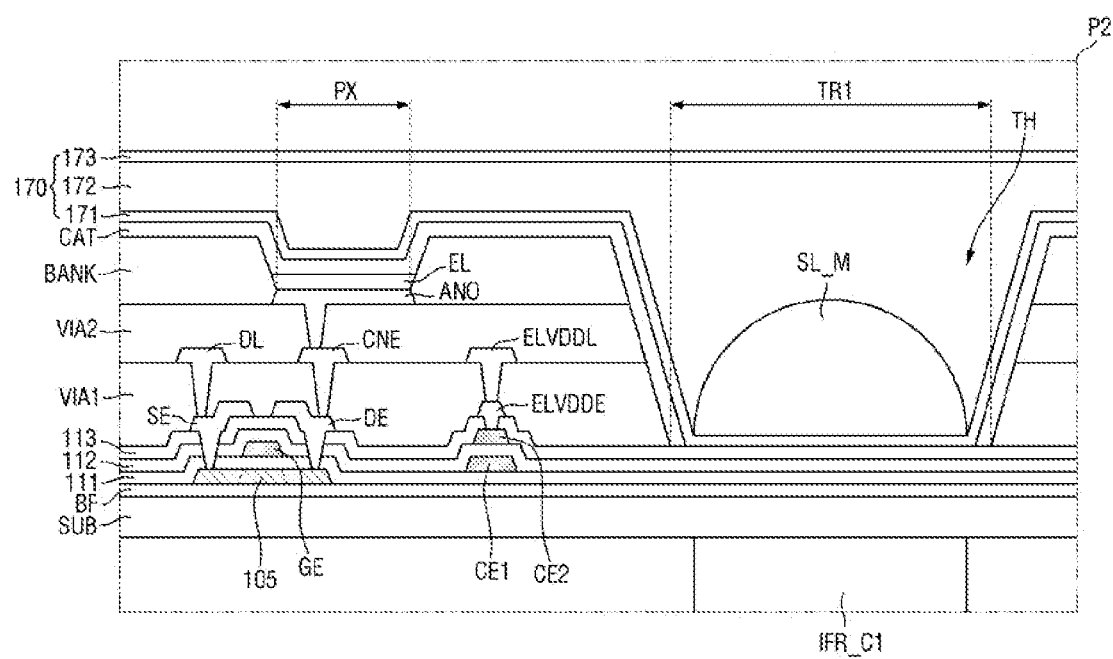
FIG. 11 is a cross-sectional view of part P2 of FIG. 10 according to an embodiment.

FIG. 10 is a cross-sectional view of a display device 1 according to an embodiment. FIG. 11 is a cross-sectional view of part P2 of FIG. 10 according to an embodiment. For convenience of explanation, a further description of elements and technical aspects previously described with reference to FIGS. 5 and 7 may be omitted.

Referring to FIG. 10, the display device 1 may further include a plurality of microlenses SL_M disposed in the first transmission area TR1.

The microlenses SL_M may focus light IFR incident on the first transmission area TR1 on the first camera sensor IFR_C1 by refracting and/or reflecting the light IFR. In an embodiment, when the microlenses SL_M are disposed, the first sensor lens SL is omitted. Thus, the overall thickness of the display device 1 may be reduced.

The microlenses SL_M may be manufactured using, for example, a mold, or may be formed using a method of dropping and curing droplets containing a highly viscous photoreactive polymer in the first transmission area TR1. However, embodiments of the present disclosure are not limited thereto.

Referring to FIG. 11, the microlenses SL_M may be disposed in the transmission hole TH. Although one microlens SL_M is illustrated in FIG. 11 for ease of description, embodiments of the present disclosure are not limited thereto. For example, in an embodiment, two or more microlenses SL_M may be disposed in the transmission hole TH.

The microlenses SL_M may be disposed on the substrate SUB of the display panel. The first camera sensor IFR_C1 may be overlapped by the microlenses SL_M in the thickness direction with the substrate SUB interposed therebetween. The curvature of each microlens SL_M may be determined by the thickness of the substrate SUB and the thickness of at least one layer stacked between the substrate SUB and the microlens SL_M. Since the first sensor lens SL is omitted, and the first camera sensor IFR_C1 is in close contact with a rear surface of the display unit DP (the substrate SUB), and the thickness of the display device 1 may be reduced.

In FIG. 11, the microlens SL_M are directly disposed on the first encapsulating inorganic layer 171. However, embodiments of the present disclosure are not limited thereto. A layer on which the microlens SL_M is disposed may vary according to a depth and/or a layer to/through which the transmission hole TH penetrates. For example, the microlens SL_M may be directly disposed on the substrate SUB, the buffer layer BF, the first insulating layer 111, the second insulating layer 112, the third insulating layer 113, or the second encapsulating inorganic layer 173. However, embodiments of the present disclosure are not limited thereto.

An embodiment according to FIG. 11 is substantially the same as or similar to an embodiment according to FIGS. 1 through 7 except for the arrangement of the microlenses SL_M, and thus, for convenience of explanation, a redundant description thereof is omitted.

FIG. 12 is a flowchart illustrating a method of controlling a display device according to an embodiment.

The following method of controlling the display device may be performed by a control unit.

Referring to FIGS. 1 through 12, a method of controlling the display device according to an embodiment may include emitting light IFR from the light sources IFR_L1 through IFR_L4 or IFR_L5 through IFR_L8 disposed on the multi-channel lens LS toward the user's pupil PP (S1201), focusing the light IFR, which is reflected from the user's pupil PP, passed through the hole H1 or H2 formed at the center of the multi-channel lens LS and then transmitted through the transmission area TR1 or TR2 formed in the display unit DP, on the camera sensor IFR_C1 or IFR_C2 (S1202), and calculating the position of the user's pupil PP based on the light IFR received by the camera sensor IFR_C1 or IFR_C2 (S1203).

The method of controlling the display device according to an embodiment is not limited to the above example. For example, according to embodiments, at least some of the above operations may be omitted, or at least one other operation may be further included with reference to other descriptions in the present disclosure.

Since the display device 1 has a symmetrical structure corresponding to both eyes of a user, the first lens LS1, the first transmission area TR1, the first camera sensor IFR_C1, and elements adjacent to them, all of which correspond to one eye of the user, will be mainly described below.

Referring to FIGS. 1, 2 and 5, in an embodiment, it is determined whether a user is wearing the display device 1. When the user is wearing the display device 1, light IFR, for example, infrared light, may be emitted from the light sources IFR_L1 through IFR_L8 toward the user's eyeballs EB.

As illustrated in FIG. 5, the light IFR emitted from the light sources IFR_L1 through IFR_L4 may be reflected from the user's eyeball EB to pass through the first hole HE The light IFR passing through the first hole H1 may be refracted and/or reflected by the first center lens CLS1 to enter the first transmission area TR1.

Referring to FIG. 9, when the first center lens CLS1 is not mounted in the first hole H1, the light IFR reflected from the user's eyeball EB may pass through the first hole H1 as it is about to enter the first transmission area TR1.

Still referring to FIG. 9, when a light source IFR_LC is mounted in the first hole H1, the light IFR reflected from the user's eyeball EB may be incident on the first lens LS1. The light IFR incident on the first lens LS1 may be refracted and/or reflected by the first lens LS1 to enter the first transmission area TR1.

Referring again to FIG. 5, the light IFR incident on the first transmission area TR1 may pass through the first transmission area TR1 to enter the first sensor lens SL. The light IFR incident on the first sensor lens SL may be refracted and/or reflected by the first sensor lens SL, and thus focused on the first camera sensor IFR_C1.

Referring to FIG. 10, the light IFR incident on the first transmission area TR1 may be refracted and/or reflected by a plurality of microlenses, and thus focused on the first camera sensor IFR_C1.

Referring again to FIG. 5, the first camera sensor IFR_C1 may obtain an image for calculating the user's gaze direction by photographing the incident light IFR. The captured image may be processed to efficiently capture feature points of the user's eyeball EB and correct distortion due to a lens or the like.

After the image is processed, it may be determined whether the processed image contains the user's pupil PP. When the processed image contains the user's pupil PP, the position of the user's pupil PP can be identified. The position of the user's pupil PP may be identified by applying various eye tracking methods such as, for example, a pupil tracking method in which the contrast of the user's pupil PP and its surroundings is used, and a limbus tracking method in which the contrast of the user's iris and its surroundings is used. For example, the position of the user's pupil PP and the user's gaze direction may be determined using a vector value calculated based on a difference between relative positions of a center point of the user's pupil PP and light or glint reflected from the user's pupil PP.

When the user's gaze direction is determined, an output image corresponding to the user's gaze direction may be displayed on the front surface DP_FS of the display unit DP. Through repetition of the above operation, an output image corresponding to the user's gaze direction may be displayed on the display unit DP. As described above, since the output image includes partial images or partial videos that form one VR image, the display device 1 can provide the VR image corresponding to the user's gaze direction to the user.

While the present invention has been particularly shown and described with reference to the embodiments thereof, it will be understood by those of ordinary skill in the art that various changes in form and detail may be made therein without departing from the spirit and scope of the present invention as defined by the following claims.

What is claimed is:

1. A display device, comprising:
a display unit comprising a first surface that emits a first light, a second surface disposed opposite to the first surface, a first transmission area that transmits light incident on the first surface, and a second transmission area that transmits the light incident on the first surface, wherein the second transmission area is spaced apart from the first transmission area;
a first lens disposed on the first surface of the display unit and comprising a first hole,
wherein the first hole penetrates the first lens, overlaps the first transmission area in a thickness direction, and is surrounded by the first lens in a plan view;
a second lens disposed on the first surface of the display unit and spaced apart from the first lens, and comprising a second hole overlapping the second transmission area in the thickness direction and surrounded by the second lens in the plan view;
a plurality of light sources disposed on the first lens and the second lens,
wherein the light sources emit a second light;
a first camera sensor disposed on the second surface of the display unit and overlapping the first transmission area; and
a second camera sensor disposed on the second surface of the display unit and overlapping the second transmission area.

2. The display device of claim 1, wherein the first transmission area, the first hole and the first camera sensor overlap a center of the first lens in the plan view, and the second transmission area, the second hole and the second camera sensor overlap a center of the second lens in the plan view.

3. The display device of claim 1, further comprising:
a first sensor lens interposed between the first camera sensor and the first transmission area; and
a second sensor lens interposed between the second camera sensor and the second transmission area.

4. The display device of claim 1, further comprising:
a first center lens disposed in the first hole; and
a second center lens disposed in the second hole.

5. The display device of claim 1, further comprising:
a plurality of microlenses disposed in the first transmission area and the second transmission area.

6. The display device of claim 1,
wherein the first lens comprises a first sub-lens, a second sub-lens, a third sub-lens and a fourth sub-lens respectively providing a plurality of channels through which the second light emitted from the light sources passes, and
the first hole is surrounded by the first sub-lens, the second sub-lens, the third sub-lens and the fourth sub-lens in the plan view.

7. The display device of claim 6, wherein the light sources comprise a first light source disposed on the first sub-lens, a second light source disposed on the second sub-lens, a third light source disposed on the third sub-lens, and a fourth light source disposed on the fourth sub-lens.

8. The display device of claim 7, wherein each of the first sub-lens, the second sub-lens, the third sub-lens and the fourth sub-lens comprises an inclined surface sloping from the display unit toward a user's eyeball, and
the first light source, the second light source, the third light source and the fourth light source are disposed on the inclined surface of the first sub-lens, the inclined surface of the second sub-lens, the inclined surface of the third sub-lens and the inclined surface of the fourth sub-lens, respectively.

9. The display device of claim 1, wherein the light sources are disposed in the first hole and the second hole, respectively.

10. The display device of claim 1, wherein the display unit comprises a plurality of pixels, and the pixels are not disposed in the first transmission area and the second transmission area.

11. The display device of claim 1, wherein each of the first transmission area and the second transmission area comprises a transmission hole through which the second light emitted from the light sources passes.

12. The display device of claim 11, wherein the display unit comprises a display panel, the display panel comprises a substrate, a plurality of conductive layers disposed on the substrate and a plurality of insulating layers insulating the conductive layers from each other, and the transmission hole penetrates at least one of the conductive layers and the insulating layers.

13. The display device of claim 1, wherein the second light emitted from the light sources is reflected from a user's pupils, and is transmitted through the first and second transmission areas and enters the first camera sensor and the second camera sensor.

14. The display device of claim 13, wherein an output image corresponding to a position of the user's pupils detected by the first camera sensor and the second camera sensor is displayed on the display unit.

15. The display device of claim 1, wherein the first lens comprises a plurality of sub-lenses that form a convex shape on one side of the first lens and that form a concave shape on a second side of the first lens disposed opposite to the first side.

16. A display device, comprising:
a display unit comprising a first surface that emits a first light, a second surface disposed opposite to the first surface, a first transmission area that transmits light incident on the first surface, and a second transmission area that transmits the light incident on the first surface,
wherein the second transmission area is spaced apart from the first transmission area;
a first lens disposed on the first surface of the display unit and comprising a first hole overlapping the first transmission area in a thickness direction;
a second lens disposed on the first surface of the display unit and spaced apart from the first lens, and comprising a second hole overlapping the second transmission area in the thickness direction;
a plurality of light sources disposed on the first lens and the second lens,
wherein the light sources emit a second light;
a first camera sensor disposed on the second surface of the display unit and overlapping the first transmission area; and
a second camera sensor disposed on the second surface of the display unit and overlapping the second transmission area,
wherein the display unit comprises a plurality of pixels, and a number of pixels per unit area in the first transmission area and the second transmission area is smaller than that in an area excluding the first transmission area and the second transmission area from an area in which the pixels are disposed.

17. A method of controlling a display device, the method comprising:
emitting a light from a light source disposed on a multi-channel lens toward a user's pupil;
focusing the light, which is reflected from the user's pupil, passed through a hole formed at a center of the multi-channel lens and surrounded by the multi-channel lens in a plan view and then transmitted through a transmission area formed in a display unit, on a camera sensor,
wherein the hole penetrates the multi-channel lens; and
calculating a position of the user's pupil based on the light received by the camera sensor.

18. The method of claim 17, further comprising:
determining whether the user is wearing the display device before emitting the light from the light source disposed on the multi-channel lens toward the user's pupil.

19. The method of claim 17, further comprising:
processing an image obtained by the camera sensor.

20. The method of claim 19, further comprising:
determining whether the image obtained by the camera sensor includes an image of the user's pupil after processing the image obtained by the camera sensor.

21. The method of claim 17, wherein the hole is formed at the center of the multi-channel lens, and the camera sensor overlaps the center of the multi-channel lens in the plan view.

* * * * *